United States Patent [19]

O'Neal

[11] Patent Number: 5,372,011
[45] Date of Patent: Dec. 13, 1994

[54] AIR CONDITIONING AND HEAT PUMP SYSTEM UTILIZING THERMAL STORAGE

[75] Inventor: Edward J. O'Neal, Fort Myers, Fla.

[73] Assignee: Indoor Air Quality Engineering, Inc., Fort Myers, Fla.

[21] Appl. No.: 113,348

[22] Filed: Aug. 30, 1993

[51] Int. Cl.⁵ ............................................. F25D 17/02
[52] U.S. Cl. ........................................ 62/93; 62/96; 62/333; 62/434; 165/21
[58] Field of Search ............... 62/59, 93, 96, 99, 238.7, 62/324.6, 333, 434, 430, 437; 165/21

[56] References Cited

U.S. PATENT DOCUMENTS

| | | | |
|---|---|---|---|
| 1,969,187 | 8/1934 | Schutt | 62/59 |
| 3,156,101 | 11/1964 | McGuffey | 62/430 |
| 3,636,721 | 1/1972 | Rex | 62/98 |
| 3,675,441 | 7/1972 | Perez | 62/278 |
| 4,012,920 | 3/1977 | Kirschbaun | 62/2 |
| 4,294,083 | 10/1981 | King | 62/434 |
| 4,457,357 | 7/1984 | Van Arnhem | 165/21 |

FOREIGN PATENT DOCUMENTS

41533  2/1987  Japan ................... 62/99

Primary Examiner—Henry Bennet
Assistant Examiner—William C. Doerrler
Attorney, Agent, or Firm—Charles J. Brown

[57] ABSTRACT

A method and apparatus for controlling temperature and humidity of an air stream by chilling a cold storage material and warming a heat storage material by evaporation and condensation respectively from a fixed capacity refrigeration cycle, and selectively cooling and warming the air stream by controlled heat transfer from the cold and heat storage materials.

18 Claims, 4 Drawing Sheets

AIR CONDITIONING AND HEAT PUMP SYSTEM UTILIZING THERMAL STORAGE

BACKGROUND OF THE INVENTION

Small air conditioners typically utilize economical fixed capacity compressors. Because the cooling and heating needs served by such systems vary it is common practice to provide a control which turns the fixed capacity compressor on and off intermittently to match variations in the process load. However, that causes corresponding fluctuations in process conditions such as temperature and humidity. To minimize such on-off cycling, heat discharged from the compressor is sometimes added to the process load so that the compressor does not turn off but continues to operate with an excess component which offsets and is wasted by the false heat load component. This is known as a hot gas by-pass system and because it is energy wasteful it is discouraged if not prohibited by some current building codes.

No prior art air conditioning and heat pump system has been capable of controlling process temperature and humidity with a fixed capacity compressor without cycling the compressor on and off with great frequency or without wasting energy by false loading. Both have marked disadvantages. Utilization of thermal storage for cyclic peak shaving can be a solution to this problem but heretofore it has not been applied to fixed capacity air conditioning systems for control of both cooling and heating parameters.

In U.S. Pat. No. 4,761,967 an air conditioning system is described wherein coolness is stored for short periods and utilized to avoid intermittent cycling of the refrigeration systems. However, it is confined to an automotive air conditioning system which does not store both heat and coolness simultaneously or employ fixed capacity refrigeration. Instead it stores only coolness when its variable capacity compressor is operating at excess capacity for later discharge when the compressor capacity is low or turned off. U.S. Pat. No. 4,187,904 concerns intermittent storage of heat for later potential use in heating a building. However, it is not concerned with air conditioning and does not involve the storage of coolness. U.S. Pat. No. 3,523,575 concerns a fixed capacity air conditioning system wherein heat energy is stored over long periods of time from a refrigerant cycle. However, that system does not involve storage of coolness nor the simultaneous heating and cooling of air.

None of these teachings of the prior art is capable of controlling dew point and dry bulb temperatures within an air conditioning system independent of process load variations while utilizing a fixed capacity refrigeration system and without the use of a hot gas by-pass or other false loading technique.

SUMMARY OF THE INVENTION

An air conditioning and heat pump system is provided by the invention which includes separate cooling and heating coils supplied with respective cooling and heating fluids in a forced air duct. A closed-loop refrigeration system is provided which includes a fixed capacity compressor from which a refrigerant is circulated as a high pressure gas to be condensed to a high pressure liquid and then expanded to a low pressure liquid and then evaporated to a low pressure gas and returned to the fixed capacity compressor. The system includes a coolness storage capacitor having dual charging and discharging heat exchange circuits both in heat exchange contact with a relatively low temperature cold storage material. A heat storage capacitor is also included comprising dual charging and discharging heat exchange circuits both in heat exchange contact with a relatively high temperature heat storage material. The refrigerant is evaporated in the charging heat exchange circuit of the coolness storage capacitor to chill the low temperature cold storage material therein and is simultaneously condensed in the charging heat exchange circuit of the heat storage capacitor to warm the high temperature heat storage material therein. The cooling fluid for the cooling coil is circulated through the discharging heat exchange circuit in the cold storage capacitor and thus chilled by the cool storage material therein so as to cool the air in the duct. The heating fluid for the heating coil is circulated through the discharging heat exchange circuit in the heat storage capacitor and thus warmed by the heat storage material therein so as to warm the air in the duct.

In a preferred form of the system of the invention the cold storage material and the heat storage material are both phase change materials and the cold storage material has a freezing temperature substantially below that of the heat storage material.

The cold storage material may be fully or partially frozen when the coolness storage capacitor is at full capacity and fully or partially melted when it is at zero capacity, and the heat storage material may be fully or partially melted when the heat storage capacitor is at full capacity and fully or partially frozen when at zero capacity, A cooling pump may be included for circulating the cooling fluid to the cooling coil in response to an increase in dew point temperature of the air in the duct to a preselected maximum. A heating pump may be included for circulating the heating fluid to the heating coil in response to a decrease in dry bulb of the temperature of the air in the duct to a preselected minimum.

The cooling fluid is preferably a liquid having a freezing temperature below the minimum operating temperature of the coolness storage material and the heating fluid is preferably a liquid having a boiling temperature above the maximum operating temperature of the heat storage material.

A heat absorption system may be included for the refrigeration system operable if the coolness storage capacitor is at full capacity when the heat storage capacitor is at less then full capacity. It may comprise a first by-pass circuit for diverting the refrigerant from the charging heat exchanger circuit of the coolness storage capacitor to an absorption heat exchanger for absorption of heat from an external source such as the atmosphere. A heat rejection system for the refrigeration system may also be included operable if the heat storage capacitor is at full capacity when the coolness storage capacitor is at less than full capacity. It may comprise a second by-pass circuit for diverting the refrigerant from the charging heat exchanger circuit of the heat storage capacitor to a rejection heat exchanger for rejection of heat to an external source such as the atmosphere. The absorption heat exchanger and the rejection heat exchanger may be a single heat exchanger.

The invention also provides a method of controlling temperature and humidity of an air stream. The first step of the method is the chilling of a cold storage material by evaporation of a refrigerant as a liquid and the warming of a heat storage material by simultaneous condensation of the refrigerant as a gas through fixed capacity compression of the refrigerant as a gas. A cooling fluid is chilled by thermal transfer from the cold storage material and the air stream is chilled by thermal transfer from the chilled cooling fluid. A heating fluid is warmed by thermal transfer from the warmed heat storage material and the air stream is warmed by thermal transfer from the warmed heat fluid.

In a preferred form of the method the cold storage material is a phase change material which at east partially freezes during chilling by evaporation of the refrigerant and at least partially melts during chilling of the cooling fluid, and the heat storage material is also a phase change material having a higher freezing temperature than the cold storage material and which at least partially melts during warming by condensation of the refrigerant and freezes at least partially during warming of the heat fluid.

If the cold storage material is at full coolness storage capacity when the heat storage material is at less than full heat storage capacity, the refrigerant is then warmed by absorption of heat from the external source. If the heat storage material is at full heat storage capacity when the cold storage material is at less than full coolness storage capacity the refrigerant is then cooled by thermal rejection of heat to the external source.

Chilling of the cold storage material by evaporation of the refrigerant may be intermittent beginning after the cold storage material is at zero capacity and ending after the cold storage material is at full capacity. Warming of the heat storage material by condensation of the refrigerant may be intermittent beginning after the heat storage material is zero capacity and ending after the heat storage material is at full capacity. The beginning and ending of chilling of the cold storage material by evaporation of the refrigerant and the beginning and ending of warming of the heat storage material by condensation of the refrigerant may be a consequence of starting and stopping fixed capacity compression of the refrigerant. The starting and stopping of the fixed capacity compression of the refrigerant may be automatic in response to monitoring of the extent of freezing and melting of the cold and heat storage materials. The chilling of the air stream may be variable and an automatic response to an increase in the dew point temperature of the air stream to a preselected maximum and warming of the air stream may be variable and in automatic response to a decrease in the dry bulb temperature of the air stream to a preselected minimum.

DESCRIPTION OF PREFERRED EMBODIMENT

Figure 1:
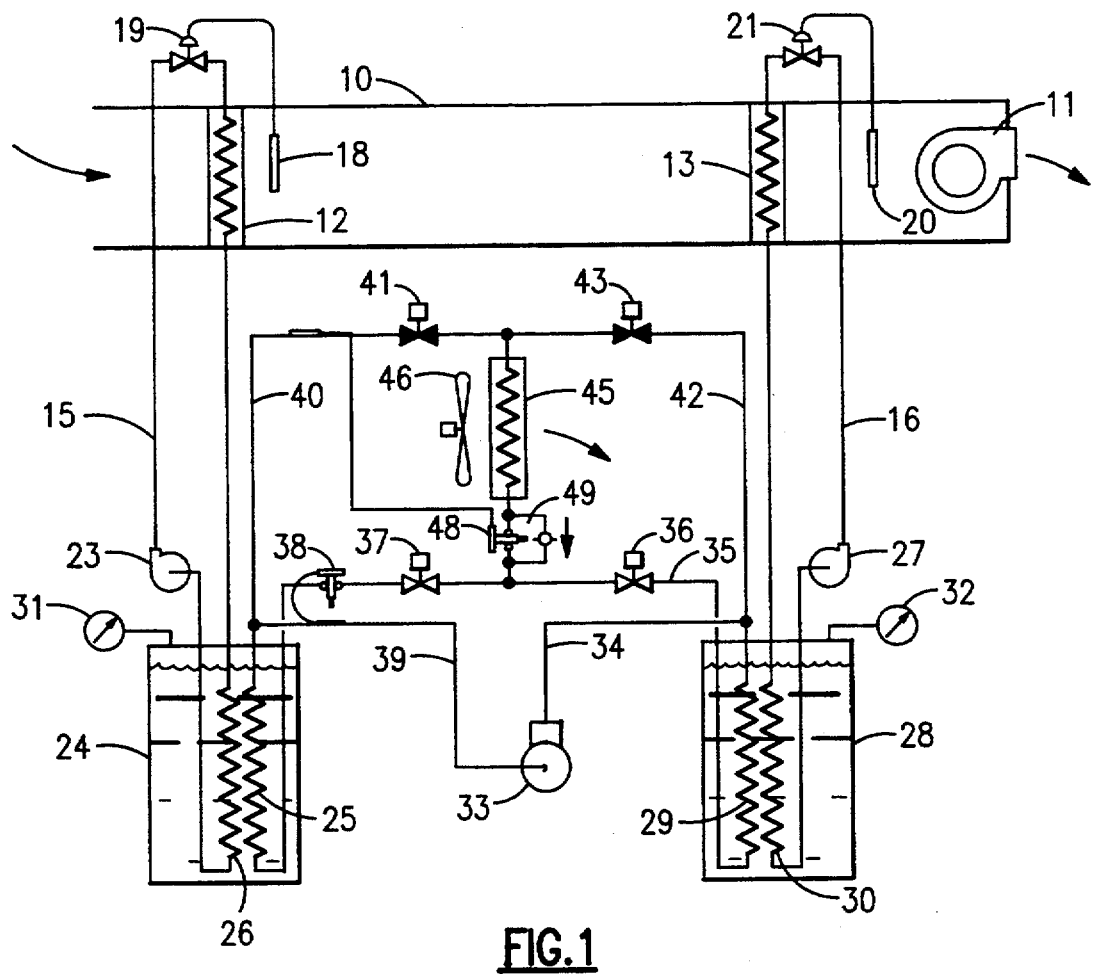
FIG. 1 is a schematic diagram of the overall system of the invention.

Referring first to FIG. 1 the air conditioning and heat pump system of the invention is shown to include a duct 10 through which air is forced by a fan 11 in the direction shown by the arrows typically from outdoors to indoors. The incoming air could be totally outdoor air or a blend of returned room air and outdoor air. In the duct 10 are a cooling coil 12 and a heating coil 13 each supplied through a cooling line 15 and a heating line 16 respectively with respective cooling and heating liquids. A typical cooling liquid may be 25% by volume of inhibited ethylene glycol and 75% by volume of deionized water having a freezing temperature slightly below that of water. A typical heating liquid may be pure water. A dew point temperature sensor 18 adjacent the cooling coil 12 operates a cooling coil modulating control valve 19 to vary flow of cooling liquid through the cooling line 15. A dry bulb temperature sensor 20 adjacent the heating coil 13 operates a heating coil modulating control valve 21 to vary flow of heating liquid through the heating line 16. The sensors 18 and 20 could be located within the air conditioned space rather than adjacent the coils 12 and 13.

A cooling circuit circulating pump 23 is provided in the cooling line 15 to draw the cooling liquid from a coolness storage capacitor 24 having dual circuit charging and discharging heat exchangers 25 and 26 respectively. Similarly a heating circuit circulating pump 26 is provided in the heating line 16 to draw the heating liquid from a heat storage capacitor 28 also having dual circuit charging and discharging heat exchangers 29 and 30 respectively. It is useful to have suitable devices 31 and 32 associated with the coolness storage capacitor 24 and the heat storage capacitor 28 respectively to indicate the degree to which the thermal storage capacity within each has been depleted or restored. The devices 31 and 32 may sense the pressure of air over a phase change material in each capacitor which varies with expansion and contraction of the freezing and thawing phase change material therein. Alternatively the devices 31 and 32 may monitor the temperature of the capacitors 24 and 28 if they do not involve phase change materials.

A closed-loop refrigeration system is provided including a fixed capacity refrigerant compressor 33 from which a conventional refrigerant such as R22 is circulated in a pressure line 34 as a high pressure gas to be condensed in the charging heat exchanger circuit 29 of the heat storage capacitor 28 and then through a line 35 through a heat absorption liquid refrigerant solenoid valve 36 and a heat rejection liquid refrigerant solenoid valve 37 to a thermal expansion valve 38. At the valve 38 the refrigerant is expanded to a low pressure liquid. The refrigerant then enters the coolness storage capacitor 24 where it passes through the charging heat exchanger circuit 25 to evaporate to a low pressure gas and is then returned to the compressor 33 through a suction line 39.

A heat absorption line 40 is provided having a heat absorption suction refrigerant solenoid valve 41, and a heat rejection line 42 is provided with a heat rejection hot gas refrigerant solenoid valve 43. When the valves 41 and 36 or 43 and 37 are open refrigerant from the respective charging heat exchange circuits of the storage capacitors may pass through a single outdoor rejection or absorption heat exchanger 45 with a fan 46. A thermal expansion valve 48 equipped with a by-pass 49 connects with the line 35 in the closed-loop refrigeration system. Refrigerant flow is in opposite directions in absorption and rejection modes, as described hereinafter.

Figure 2:
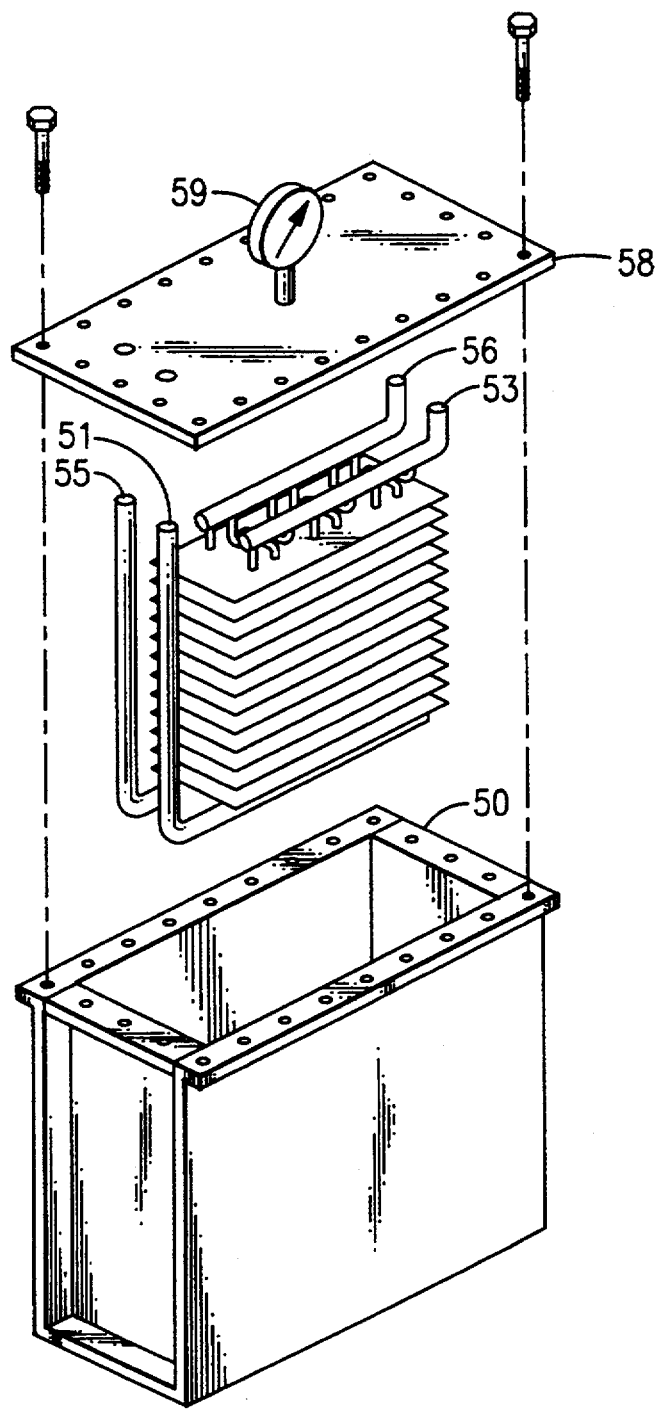
FIG. 2 is an exploded perspective view of either the coolness or heat storage capacitor.

FIG. 2 illustrates a double circuit storage capacitor serving as either the coolness storage capacitor 24 or the heat storage capacitor 28. It includes an open-top tank 50 filled partially with one of the phase change materials. For the coolness storage capacitor 24 that material may be water having a solid-liquid phase change at 32° F. For the heat storage capacitor 27 that material may be paraffin wax or polyethylene glycol having a solid-liquid phase change at a relatively high temperature such as 100° F.

The capacitor of FIG. 2 includes a charging refrigerant circuit inlet 51 connected to alternating fin tubes of either the charging heat exchanger 25 or 29 and then to a charging refrigerant circuit outlet 53. A discharging heat exchange circuit inlet 55 is connected to either of the discharge heat exchangers 26 or 29 and then to a discharging outlet 56. A tank cover plate 58 is attachable to the upper rim of the tank 50 to seal the storage capacitor. The charging and discharging heat exchangers are immersed in the respective cooling and heating liquids. Typically cooling or heating liquid in the storage capacitor stands at a level measurably below the cover plate 58 so that there is an air cushion within the tank. As described previously a sensing device indicated as 59 may be provided to monitor the degree to which freezing or thawing has taken place in the cold or heat storage material. Total freezing of the cold heat storage material and total meeting of the heat storage material may not be preferred; it is enough that at full capacity the cold storage material partially freezes and the heat storage material partially melts.

Figure 3:
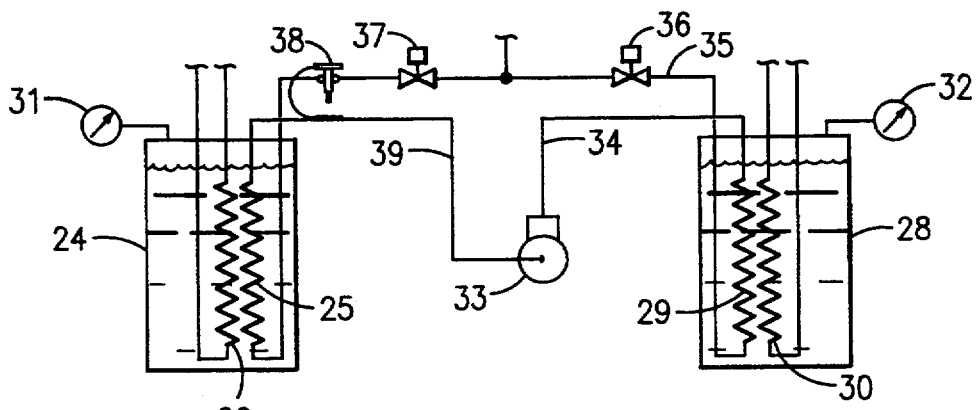
FIG. 3 is a schematic of that portion of the system operable in the storage of coolness and heat in the capacitors.

Referring to FIG. 3 the energy storage function of the system will now be described. In a normal refrigeration cycle the valves 36 and 37 are open and the valves 41 and 43 (see FIG. 1) are closed. The compressor 33 is operated so that hot refrigerant gas is delivered to the charging heat exchange circuit 29 of the heat storage capacitor 28 causing the heat storage material, i.e. paraffin, therein to melt while condensing the refrigerant to a liquid. As the heat storage phase change material melts its volume increases causing a pressure increase of the air within the heat storage capacitor 28 which is sensed by the pressure sensitive device 32.

The high pressure refrigerant liquid then passes through the thermal expansion valve 38 and the resulting low pressure liquid is delivered to the charging heat exchanger circuit 25 in the coolness storage capacitor 24. This causes the cold storage material, i.e. water, in the coolness storage capacitor 24 to freeze as the liquid refrigerant is evaporated and returned to the compressor 33. As the water freezes its volume increases causing the pressure within the capacitor 24 to rise, which is sensed by the pressure sensitive device 31. The compressor 33 is thus operated only infrequently, beginning when either the coolness storage capacitor 24 or the heat storage capacitor 28 is depleted and continuing until both the coolness and heat storage capacitor are fully charged.

Figure 4:
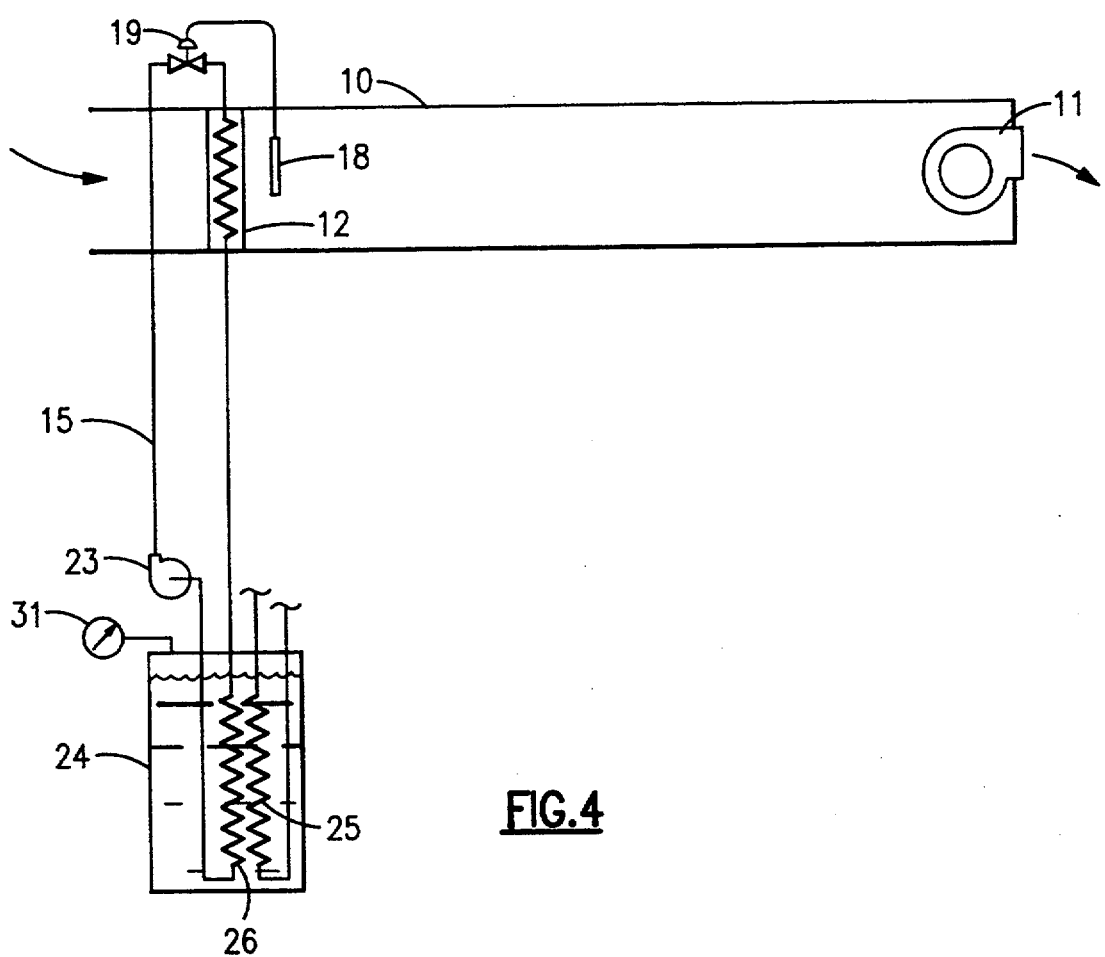
FIG. 4 is a schematic of that portion of the system operable in dew point temperature control.

The dew point temperature control system will now be described in reference to FIG. 4. A desired due point temperature may be selected which establishes a set point for the cooling coil control valve 19. If the due point temperature rises above that set point the cooling circuit pump 23 starts to provide cooling liquid to the cooling coil 12 in the duct 10. The cooling coil control valve 19 modulates open to maintain the desired due point temperature and returns the warmed cooling coil liquid to the discharging heat exchanger 26 of the coolness storage capacitor 24 for recooling. The ice frozen within the coolness storage capacitor 24 is melted during this process.

Figure 5:
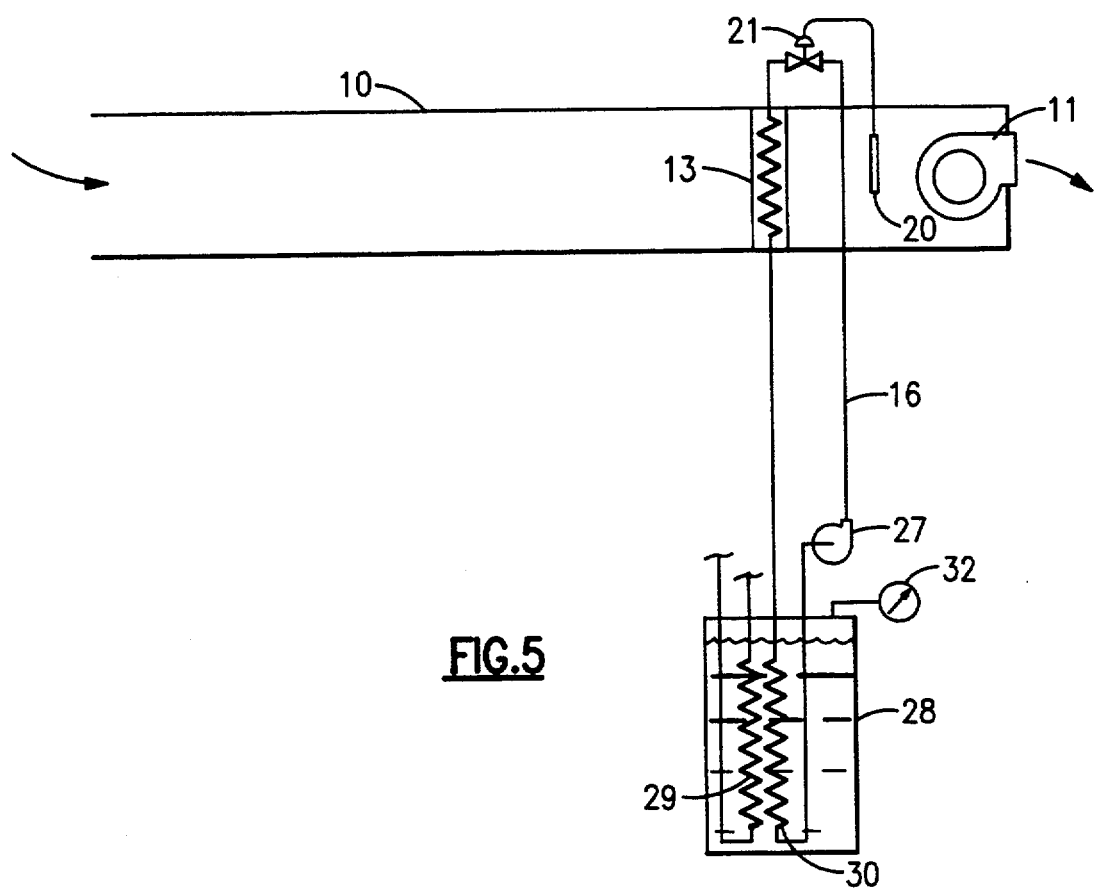
FIG. 5 is a schematic of that portion of the system operable in dry bulb temperature control.

With reference to FIG. 5 the dry bulb temperature control function will now be described. A desired dry bulb temperature may be selected which establishes a set point for the heating coil control valve 21. If the dry bulb temperature falls below that set point the heating circuit pump 27 is started to provide heating liquid from the heat storage capacitor 28 to the heating coil 13 in the air duct 10. The heating coil control valve 21 modulates open to maintain the desired dry bulb temperature and returns the cool heating liquid to the heat storage capacitor 28 for reheating. The heating liquid in the heat storage capacitor 28 is frozen during this process.

Figure 6:
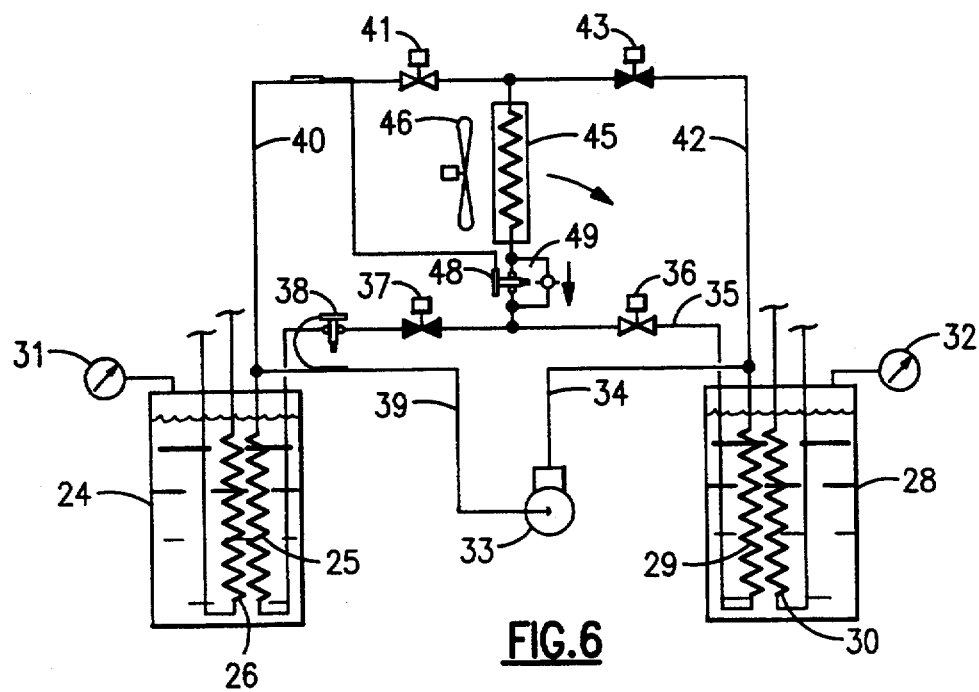
FIG. 6 is a schematic of that portion of the system operable in heat rejection and absorption.

The heat rejection and absorption functions will now be described with reference to FIG. 6. As the cooling and heating functions proceed the coolness storage and heat storage capacitors 24 and 28 are depleted. The amount of cooling and heating of processed air in the duct 10 will not be equal and therefore the storage capacitors 24 and 28 will be depleted unequally. When either of the storage capacitors 24 or 28 is fully discharged the compressor 33 starts and the storage function described above continues until both storage capacitors 24 and 28 are fully charged. Excess heat must be rejected or additional heat absorbed under these charging conditions. Heat rejection to and absorption from atmosphere is preferred but other external sources may be utilized such as a water mass.

If the heat storage capacitor 28 reaches full charge prior to the coolness storage capacitor 24 excess heat must rejected. The outdoor heat exchanger fan 46 is started, the valves 37 and 43 are opened and the valves 36 and 41 are closed. Hot refrigerant gas is thereby diverted from the 34 through the line 42 to the outdoor heat exchanger 45, condensed to reject its excess heat and returned through the valve 37 to the coolness storage capacitor 24. This process continues until the coolness storage capacitor 24 reaches full charge.

If the coolness storage capacitor 24 reaches full charge prior to the heat storage capacitor 28 excess heat must be absorbed. Again, the outdoor heat exchanger fan 46 started, the valves 36 and 41 are opened and the valves 37 and 43 are closed. High pressure refrigerant liquid is diverted through the thermal expansion valve 48 to the outdoor heat exchanger 45, evaporated while absorbing the needed heat and returned to the compressor 33 through the valve 41. Under some conditions frost may form on the outdoor heat exchanger coil 45 and in that event the heat rejection mode described above is momentarily energized to defrost the coil 45. Note that unlike in a normal heat pump cycle heat is then delivered to the air conditioning system continuously during the defrost cycle. This heat absorption process continues until the heat storage capacitor 28 reaches full charge.

It will be understood that the air conditioning heat pump system utilizing thermal storage as described and claimed herein, whether as an apparatus or a methods, is intended to cycle relatively frequently as needed by operation of the pumps 23 and 27 to adjust and control dew point temperature and dry bulb temperature whether in the duct itself or in the room space downstream. This frequency may be as little as a fraction of an hour. During the frequent operation of the pumps 23 and 27 as the cold and heat storage capacitors 24 and 28 are being slowly depleted the fixed capacity compressor 33 remains turned off. Only when recharging of the capacitors is required does the compressor 33 have to operate, and that may be after long intervals of many hours.

The scope of the invention is to be determined from the following claims rather than from the foregoing description of preferred embodiment.

I claim:

1. An air conditioning and heat pump system comprising
   a) separate cooling and heating coils supplied with respective cooling and heating fluids in a forced air duct,
   b) a closed loop refrigeration system including a fixed capacity compressor from which a refrigerant is circulated as a high pressure gas to be condensed to a high pressure liquid and then expanded to a low pressure liquid and then evaporated to a low pressure gas and returned to the fixed capacity compressor,
   c) a coolness storage capacitor including dual charging and discharging heat exchange circuits both in heat exchange relation with a relatively low temperature cold storage material,
   d) a heat storage capacitor comprising dual charging and discharging heat exchange circuits both in heat exchange relation with a relatively high temperature heat storage material,
   e) said refrigerant being evaporated in the charging heat exchange circuit of the coolness storage capacitor to directly chill the low temperature cold storage material therein and being simultaneously condensed in the charging heat exchange circuit of the heat storage capacitor to simultaneously warm the high temperature heat storage material therein,
   f) the cooling fluid for the cooling coil being circulated through the discharging heat exchange circuit in the coolness storage capacitor and thus chilled by the cold storage material therein so as to cool the air in the duct, and
   g) the heating fluid for the heating coil being circulated through the discharging heat exchange circuit in the heat storage capacitor and thus warmed by the heat storage material therein so as to warm the air in the duct.

2. An air conditioning and heat pump system according to claim 1 wherein the cold storage material and the heat storage material are both phase change materials, the cold storage material having a freezing temperature substantially below that of the heat storage material.

3. An air conditioning and heat pump system according to claim 2 wherein the cold storage material is at least partially frozen when the coolness storage capacitor is at full capacity and at least partially melted when it is at zero capacity, and the heat storage material is at least partially melted when the heat storage capacitor is at full capacity and at least partially frozen when it is at zero capacity.

4. An air conditioning and heat pump system according to claim 1 which includes a cooling pump for circulating the cooling fluid to the cooling coil in response to an increase in temperature of the air in the duct to a preselected maximum.

5. An air conditioning and heat pump system according to claim 1 which includes a heating pump for circulating the heating fluid to the heating coil in response to a decrease in temperature of the air in the duct to a preselected minimum.

6. An air conditioning and heat pump system according to claim 1 wherein the cooling fluid is a liquid having a freezing temperature below the minimum operating temperature of the coolness storage material and the heating fluid is a liquid having a boiling temperature above the maximum operating temperature of the heat storage material.

7. An air conditioning and heat pump system according to claim 1 which includes a heat absorption system for the refrigeration system operable if the coolness storage capacitor is at full capacity when the heat storage capacitor is at less than full capacity comprising a first by-pass circuit for diverting the refrigerant from the charging heat exchanger circuit of the coolness storage capacitor to an absorption heat exchanger for absorption of heat from an external source, and a heat rejection system for the refrigeration system operable if the heat storage capacitor is at full capacity when the coolness storage capacitor is at less than full capacity comprising a second by-pass circuit for diverting the refrigerant from the charging heat exchange circuit of the heat storage capacitor to a rejection heat exchanger for rejection of heat to an external source.

8. An air conditioning and heat pump system according to claim 7 wherein the absorption heat exchanger and the rejection heat exchanger is a single heat exchanger.

9. An air conditioning and heat pump system comprising
   a) separate cooling and heating coils supplied with respective cooling and heating liquids in a forced air duct,
   b) a closed loop refrigeration system including a fixed capacity compressor from which a refrigerant is circulated as a high pressure gas to be condensed to a high pressure liquid and then expanded to a low pressure liquid and then evaporated to a low pressure gas and returned to the fixed capacity compressor,
   c) a coolness storage capacitor including dual charging and discharging heat exchange circuits both immersed in and in heat exchange contact with a cold storage phase change material having a relatively low freezing temperature,
   d) a cooling pump for circulating the cooling liquid to the cooling coil in response to an increase in temperature of the air in the duct to a preselected maximum,
   e) a heat storage capacitor comprising dual charging and discharging heat exchange circuits both immersed in and in heat exchange contact with a heat storage phase change material having a freezing temperature substantially above that of the cold storage phase change material,
   f) a heating pump for circulating the heating liquid to the heating coil in response to a decrease in temperature of the air in the duct to a preselected minimum,
   g) the cooling liquid having a freezing temperature below the minimum operating temperature of the coolness storage material and the heating liquid having a boiling temperature above the maximum operating temperature of the heat storage material.
   h) said refrigerant being evaporated in the charging heat exchange circuit of the coolness storage capacitor to freeze and further chill the low temperature cold storage material therein and being simultaneously condensed in the charging heat exchange circuit of the heat storage capacitor to simultaneously melt and further warm the high temperature heat storage material therein, i) the cooling liquid for the cooling coil being circulated through the discharging heat exchange circuit in the coolness storage capacitor and thus chilled by the frozen cold storage material therein so as to cool the air in the duct, j) the heating liquid for the heating coil being circulated through the discharging heat exchange circuit in the heat storage capacitor and thus warmed by the melted heat storage material therein so as to warm the air in the duct, k) a heat absorption system for the refrigeration system operable if the coolness storage capacitor is at full capacity when the heat storage capacitor is at less than full capacity comprising a first bypass circuit for diverting the refrigerant from the charging heat exchange circuit of the coolness storage capacitor to an absorption heat exchanger for absorption of heat from an external source, and l) a heat rejection system for the refrigerant system operable if the heat storage capacitor is at full capacity when the coolness storage capacitor is at less than full capacity comprising a second bypass circuit for diverting the refrigerant from the charging heat exchange circuit of the heat storage capacitor to a rejection heat exchanger for rejection of heat to an external source, m) said heat absorption and rejection heat exchanger being a single heat exchanger.

10. A method of controlling temperature and humidity of an air stream which comprises a) chilling a cold storage material directly by evaporation of a refrigerant as a liquid and warming a heat storage material by simultaneous condensation of said refrigerant as a gas through fixed capacity compression of the refrigerant as a gas, b) chilling a cooling fluid by thermal transfer from the chilled cold storage material, c) chilling the air stream by thermal transfer from the chilled cooling fluid, d) warming a heating fluid by thermal transfer from the warmed heat storage material, and e) warming the air stream by thermal transfer from the warmed heating fluid.

11. A method according to claim 10 wherein the cold storage material is a phase change material which at least partially freezes during chilling by evaporation of the refrigerant and melts during chilling of the cooling fluid, and wherein the heat storage material is a phase change material having a higher freezing temperature than the cold storage material and which at least partially melts during warming by condensation of the refrigerant and freezes during warming of the heating fluid.

12. A method according to claim 9 wherein the cold storage material is a phase change material which at least partially freezes during chilling by evaporation of the refrigerant and at least partially melts during chilling of the cooling fluid, and wherein the heat storage material is a phase change material having a higher freezing temperature than the cold storage material and which at least partially melts during warming by condensation of the refrigerant and at least partially freezes during warming of the heating fluid.

13. A method according to claim 10 wherein if the cold storage material is at full coolness storage capacity when the heat storage material is at less than full heat storage capacity the refrigerant is then warmed by absorption of heat from an external source, and wherein if the heat storage material is at full heat storage capacity when the cold storage material is at less than full coolness storage capacity the refrigerant is then cooled by thermal rejection of heat to an external source.

14. A method according to claim 10 wherein chilling of the cold storage material by evaporation of the refrigerant is intermittent beginning after the cold storage material is at zero capacity and ending after the cold storage material is at full capacity, and wherein the warming of the heat storage material by condensation of the refrigerant is intermittent beginning after the heat storage material is at zero capacity and ending after the heat storage material is at full capacity.

15. A method according to claim 14 wherein the beginning and ending of chilling of the cold storage material by evaporation of the refrigerant and the beginning and ending of warming of the heat storage material by condensation of the refrigerant is a consequence of starting and stopping the fixed capacity compression of the refrigerant.

16. A method according to claim 15 wherein the starting and stopping of the fixed capacity compression of the refrigerant is automatic in response to monitoring of the extent of freezing and melting of the cold and heat storage materials.

17. A method according to claim 10 wherein chilling of the air stream is variable and in automatic response to an increase in the dew point temperature of the air stream to a preselected maximum and warming of the air stream is variable and in automatic response to a decrease in the dry bulb temperature of the air stream to a preselected minimum.

18. A method of controlling temperature and humidity of an air stream which comprises a) chilling a cold storage phase change material at least partially freezing it by evaporation of a refrigerant as a liquid and warming a heat storage phase change material having a higher freezing temperature than the cold storage material by at least partially melting it by simultaneous condensation of said refrigerant as a gas;

b) selectively and intermittently compressing said refrigerant as a gas by fixed capacity compression starting and stopping in response to monitoring of the extent of freezing and melting of the cold and heat storage materials;

c) if the cold storage material is at full coolness storage capacity when the heat storage material is at less than full heat storage capacity, then warming the refrigerant by absorption of heat from the atmosphere and, if the heat storage material is at full heat storage capacity when the coolness storage material is at less than coolness storage capacity, then cooling the refrigerant by thermal rejection of heat into the atmosphere;

d) chilling a cooling liquid by thermal transfer from the chilled coldness storage material;

e) chilling the air stream by thermal transfer from the chilled cooling liquid;

f) said chilling of the air stream being variable and in automatic response to an increase in the temperature of the air stream to a preselected maximum;

g) warming a heating liquid by thermal transfer from the warmed heat storage material; and h) warming the air stream by thermal transfer from the warmed heating liquid;

i) said warming of the air stream being variable and in automatic response to a decrease in the temperature of the air stream to a preselected minimum.

* * * * *